(12) United States Patent
Van De Meulenhof et al.

(10) Patent No.: US 10,309,856 B2
(45) Date of Patent: Jun. 4, 2019

(54) METHOD OF CALIBRATING A SENSOR

(71) Applicant: SIGNIFY HOLDING B.V., Eindhoven (NL)

(72) Inventors: Dennis Van De Meulenhof, Helmond (NL); Johannes Arnoldus Cornelis Bernsen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 509 days.

(21) Appl. No.: 14/897,833

(22) PCT Filed: May 30, 2014

(86) PCT No.: PCT/EP2014/061273
§ 371 (c)(1),
(2) Date: Dec. 11, 2015

(87) PCT Pub. No.: WO2014/198564
PCT Pub. Date: Dec. 18, 2014

(65) Prior Publication Data
US 2016/0138993 A1 May 19, 2016

(30) Foreign Application Priority Data
Jun. 11, 2013 (EP) ..................................... 13171486

(51) Int. Cl.
*G01L 27/00* (2006.01)
*G01W 1/00* (2006.01)
*G01P 21/02* (2006.01)
*G01P 21/00* (2006.01)
*G01S 19/13* (2010.01)
*G01W 1/18* (2006.01)
*G01D 18/00* (2006.01)

(52) U.S. Cl.
CPC .......... *G01L 27/002* (2013.01); *G01L 27/005* (2013.01); *G01P 21/00* (2013.01); *G01P 21/025* (2013.01); *G01S 19/13* (2013.01); *G01W 1/00* (2013.01); *G01W 1/18* (2013.01); *G01D 18/008* (2013.01)

(58) Field of Classification Search
CPC .......................... G01L 27/002; G01L 27/005
USPC .......................................................... 702/104
See application file for complete search history.

(56) References Cited

U.S. PATENT DOCUMENTS

2008/0289415 A1* 11/2008 Savolainen ............. G01C 5/06
73/384
2012/0296594 A1* 11/2012 Kristensson .......... G01L 27/005
702/94
2013/0009554 A1 1/2013 Ho et al.
(Continued)

FOREIGN PATENT DOCUMENTS

CN 102203558 A 9/2011
EP 1115241 A2 11/2001
(Continued)

*Primary Examiner* — Ricky Ngon
(74) *Attorney, Agent, or Firm* — Meenakshy Chakravorty

(57) ABSTRACT

A method of calibrating a sensor, comprising: —determining a position of the sensor; —providing sensor data comprising identification data and the position of the sensor to a calibration data provider; —obtaining calibration data from the calibration data provider; and —calibrating the sensor in accordance with the calibration data.

17 Claims, 4 Drawing Sheets

(56) References Cited

U.S. PATENT DOCUMENTS

| | | | | |
|---|---|---|---|---|
| 2013/0136301 A1* | 5/2013 | Abrahamsson | ............ | G06K 9/00 |
| | | | | 382/103 |
| 2013/0179108 A1* | 7/2013 | Joseph | ................... | G01D 18/00 |
| | | | | 702/104 |
| 2014/0019080 A1* | 1/2014 | Chan | ...................... | G01P 21/00 |
| | | | | 702/104 |
| 2014/0200834 A1* | 7/2014 | Ross | ................... | A43B 3/0005 |
| | | | | 702/41 |
| 2014/0238100 A1* | 8/2014 | Londergan | .......... | G01N 33/0006 |
| | | | | 73/1.03 |
| 2014/0244198 A1* | 8/2014 | Mayer | ................ | G01N 33/0006 |
| | | | | 702/104 |
| 2015/0061938 A1* | 3/2015 | Moraleda | .............. | G01S 5/0294 |
| | | | | 342/452 |
| 2016/0081599 A1* | 3/2016 | Valdes | ................ | G06F 19/3412 |
| | | | | 600/365 |

FOREIGN PATENT DOCUMENTS

| | | | |
|---|---|---|---|
| EP | 1154231 | A1 | 11/2001 |
| EP | 2525202 | A1 | 11/2012 |
| WO | 2006095317 | A1 | 9/2006 |
| WO | 2006136985 | A1 | 12/2006 |
| WO | 2007072314 | A1 | 6/2007 |
| WO | 2007132382 | A2 | 11/2007 |
| WO | 2009093158 | A1 | 7/2009 |
| WO | 2013016439 | A1 | 1/2013 |

* cited by examiner

METHOD OF CALIBRATING A SENSOR

CROSS-REFERENCE TO PRIOR APPLICATIONS

This application is the U.S. National Phase application under 35 U.S.C. § 371 of International Application No. PCT/EP2014/061273, filed on May 30, 2014, which claims the benefit of European Patent Application No. 13171486.7, filed on Jun. 11, 2013. These applications are hereby incorporated by reference herein.

FIELD OF THE INVENTION

The present invention relates to a method of calibrating a sensor.

BACKGROUND OF THE INVENTION

Sensors are increasingly used in products for indoor and/or outdoor use. Often these products are price sensitive. Calibrating the sensors in manufacturing adds cost, and therefore it is desirable to leave the calibration to the user during installation of the product. However such user performed calibration adds usability complexity. The user will be confronted with technical and other details unknown, or it might even be undoable if no reference data is available for the calibration. Additionally, the position of the sensor is affecting the calibration in many cases, for instance when the sensor is a barometric sensor or a wind speed sensor. The location of a sensor may give it an offset. For example the height of a barometric sensor gives it an offset because barometric pressure decreases with height. It makes a difference if a user installs a barometric pressure sensor, or a wind speed sensor, etc., on the ground floor of a building or on the highest floor of a building.

SUMMARY OF THE INVENTION

It would be advantageous to provide a solution for how to obtain a reliable user initiated calibration of a sensor.

To better address this concern, in a first aspect of the invention there is presented a method of calibrating a sensor, which method comprises:
  initiating a calibration procedure from a mobile device,
  establishing a communication between a mobile device and the sensor,
  obtaining an identification of the sensor by the mobile device,
  determining a position of the mobile device,
  sending a request for calibration data to a calibration data provider, the request comprising at least the identification of the sensor and the position of the mobile device,
  receiving calibration data from the calibration data provider, the calibration data corresponding to currently sensed values by at least one other sensor that is already calibrated and of the same type as the sensor to be calibrated,
  calibrating the sensor in accordance with the calibration data.

By performing this method it can be ensured that relevant calibration data is obtained. It should be noted that the position of the sensor can be related to, for instance, longitude, latitude, altitude and/or whether the sensor is indoor or outdoor, depending on what is relevant for the type of sensor.

According to an embodiment of the method, the operation of providing sensor data to a calibration data provider comprises sending the sensor data to a server, and the operation of obtaining calibration data from the calibration data provider comprises receiving the calibration data from the server. Arranging the calibration data provider at, or communicating with the calibration data provider via, a server gives a range of freedom for designing the calibration data provider, the acquisition of calibration data, efficient ways of updating the calibration data, etc.

According to an embodiment of the method, it comprises generating the calibration data by obtaining currently sensed values from at least one calibrated sensor, and compensating the currently sensed values for a difference in position between the sensor to be calibrated and the at least one calibrated sensor. Considering the number of devices carrying sensors that are sold soon there will be reference data which is fully relevant for the position of the sensor almost everywhere.

According to an embodiment of the method, the currently sensed values are dependent of at least one of latitude, longitude, altitude, and weather data.

According to an embodiment of the method, it is performed at a mobile device communicating with the sensor. It is advantageous to be able to produce e.g. an app by means of which the method is executed on a mobile device, such as a smart phone, a tablet, or some other suitable mobile device.

According to an embodiment of the method, the operation of determining a position comprises obtaining a position from a position provider internally of the mobile device. This is another advantage of employing a mobile device, since most mobile devices of today already has an integrated position provider, such as a GPS (Global Positioning System) receiver.

According to an embodiment of the method, the operations of providing sensor data and obtaining calibration data are performed by the mobile device communicating with a server. As already mentioned above, the use of a server for providing the calibration data is advantageous.

In accordance with another aspect of the present invention, there is provided a device for calibrating a sensor, comprising:
  a position provider, configured to provide a position of the sensor
  means for obtaining sensor data comprising identification data;
  means for providing the sensor data to a calibration data provider and for obtaining calibration data from the calibration data provider; and
  means for calibrating the sensor in accordance with the calibration data. The device for calibrating a sensor is advantageously realized by means of a mobile device, such as a smart phone, a tablet, etc. The sensor may be mounted in the mobile device as well.

In accordance with another aspect of the present invention, there is provided a calibration data provider, comprising:
  means for obtaining sensor data about a sensor to be calibrated;
  means for obtaining currently sensed values from at least one calibrated sensor;
  means for compensating the currently sensed values for a difference in position between the sensor to be calibrated and the at least one calibrated sensor and generating corresponding calibration data; and means for providing the calibration data to the sensor. This device is advantageously realized by means of a server or the like which is conveniently capable of connecting with several previously calibrated sensors.

In accordance with another aspect of the present invention there is provided a method of providing a sensor with calibration data, comprising:
receiving a calibration request from a sensor to be calibrated, the request comprising sensor data including identification data and the position of the sensor;
generating calibration data; and
providing the sensor with the calibration data. This method is possible to implement as a computer program running on a remote device, such as a server or the like.

According to an embodiment of the method of providing a sensor with calibration data, the operation of generating calibration data comprises obtaining currently sensed values from at least one calibrated sensor, and compensating the currently sensed values for any difference in position between the sensor to be calibrated and the at least one calibrated sensor. By using current values of other sensors, which have already been calibrated, reliable values for the calibration to take place are obtained.

BRIEF DESCRIPTION OF THE DRAWINGS

The invention will now be described in more detail and with reference to the appended drawings in which.

DESCRIPTION OF EMBODIMENTS

Figure 1:
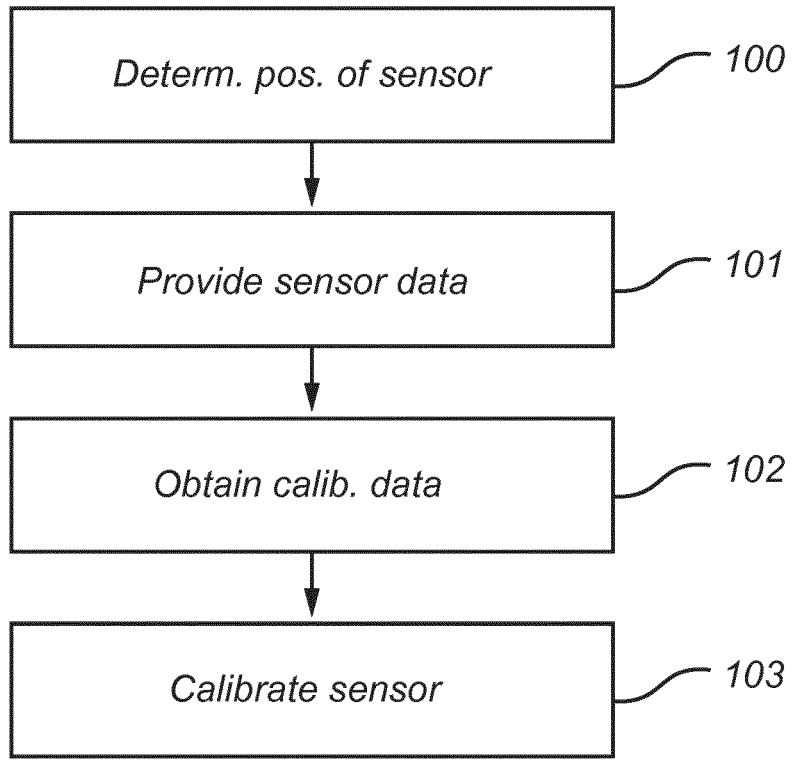
FIGS. 1 and 2 are flow charts illustrating embodiments of methods according to the present invention.

According to an embodiment of the method of calibrating a sensor there are the general operations of determining a position of the sensor, see box 100 in FIG. 1; providing sensor data comprising identification data and the position of the sensor to a calibration data provider, box 101; obtaining calibration data from the calibration data provider, box 102; and calibrating the sensor in accordance with the calibration data, box 103. At least some of the operations can be performed at alternative devices, as will be exemplified below.

Figure 2:
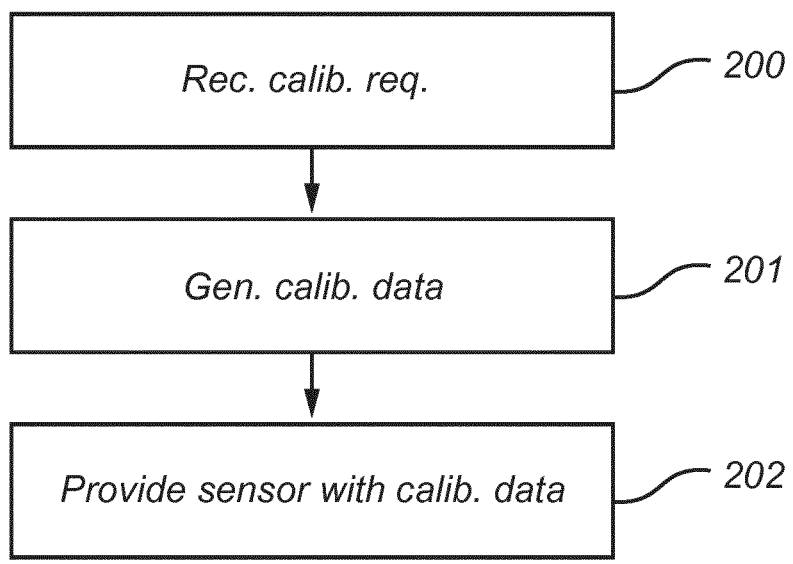

The method of calibrating the sensor is interacting with a method of providing the sensor with calibration data. An embodiment thereof comprises the general operations of receiving a calibration request from a sensor to be calibrated, the request comprising sensor data including identification data and the position of the sensor, see box 200 in FIG. 2; generating calibration data, see box 201; and providing the sensor with the calibration data, box 202. The interaction of the method of calibrating the sensor and the method of providing the sensor with calibration data can be considered as being related to the interaction between a method of data communication, where some operations are performed at one end and other operations are performed at the other end. Here, the embodiment of the method of calibrating the sensor is typically implemented at a first device, and the method of providing the sensor with calibration data is typically implemented at a second device, where the first and second devices communicate with each other in order to perform the operations of the methods.

Figure 3:
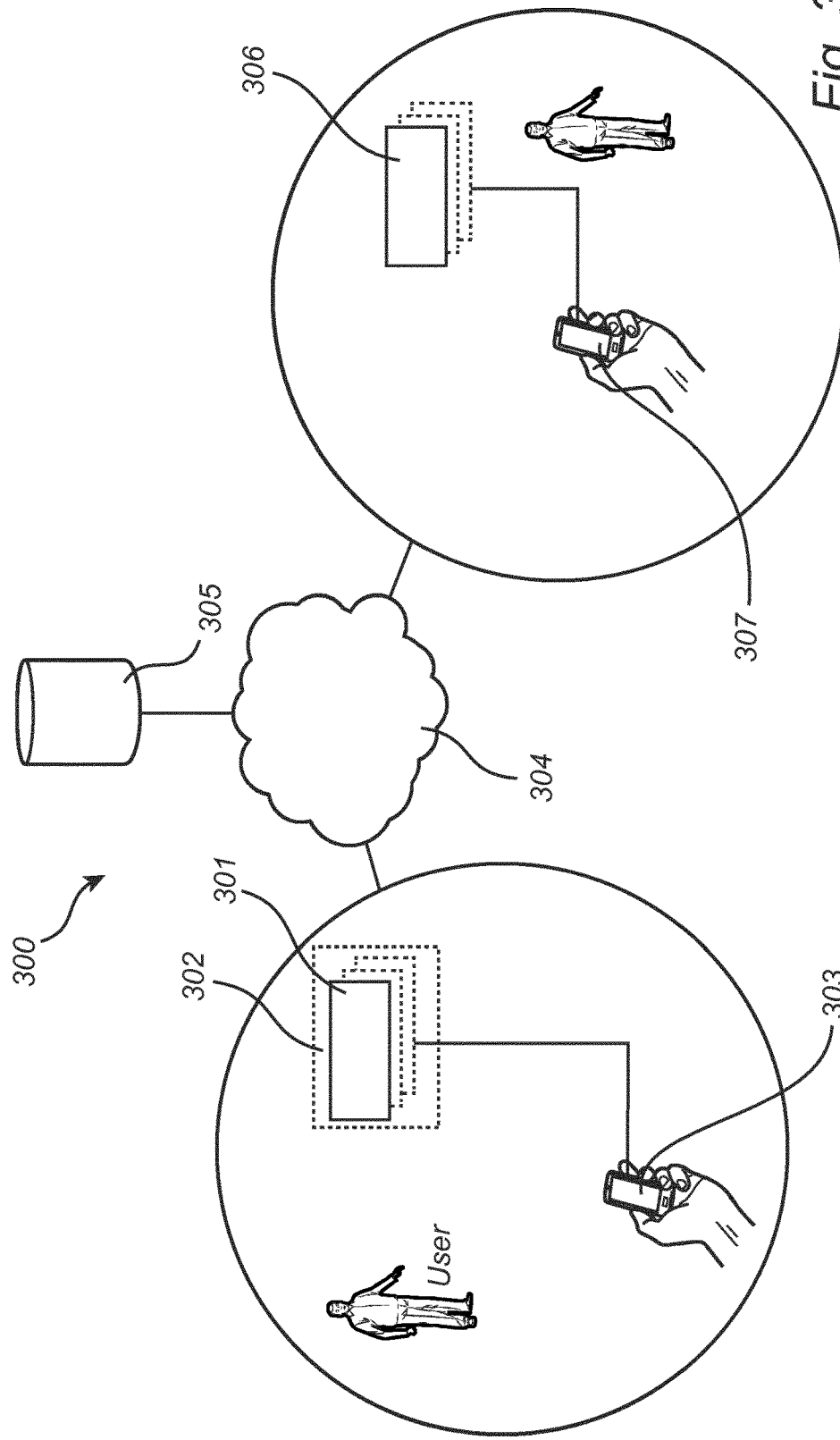
FIG. 3 schematically illustrates an embodiment of a system for sensor calibration according to the present invention.

The above methods are in particular intended to be implemented in a system for sensor calibration 300 where users own one or more sensors 301, which is/are combined in one product or in more products 302, for indoor and/or outdoor use, where the sensor/sensors 301 upload information to one or more services, at a server 305, typically via a connection with a mobile device 303 and further via the Internet 304, as illustrated in FIG. 3. The products 302 are sold by a business and the services 305 are run by the same business or via information gained via third-party services.

In the user premises at a first location A, a first sensor 301 will be used, e.g., barometric sensor, an altitude sensor, a wind speed sensor, etc. However, the position of the first sensor 301 may give it an offset. For instance, the height of a barometric sensor 301 gives it an offset because barometric pressure decreases with height. It makes a difference if a user installs for instance a barometric pressure sensor or a wind speed sensor on the ground floor of a building or on the highest floor of a building. Alternatively, or additionally, the basic setting at manufacturing the first sensor 301 may have been a bit incorrect. Then the first sensor 301 needs to be calibrated.

In order to calibrate the first sensor 301, a previously calibrated second sensor 306, which is of the same kind as the first sensor 301, of another user at a second location B, or typically several second sensors of one or more other users, is used as reference in case the relation between the first and second locations A, B, for providing first sensor 301 with calibration data. The server 305 acts as a calibration data provider, and upon a request for calibration data received from the first sensor 301 it collects reference data from the second sensor 306, generates corresponding calibration data and sends the calibration data to the first sensor 301.

A method of calibrating a sensor according to the invention can therefore comprise the following steps of:
initiating a calibration procedure from a mobile device 303,
establishing a communication between a mobile device 303 and the sensor,
obtaining an identification (ID) of the sensor by the mobile device 303,
determining a position of the mobile device 303,
sending a request for calibration data to a calibration data provider, the request comprising at least the identification (ID) of the sensor and the position of the mobile device 303, the request being sent by the mobile device 303,
receiving calibration data from the calibration data provider, the calibration data corresponding to currently sensed values by at least one other sensor that is already calibrated and of the same type as the sensor to be calibrated,
calibrating the sensor in accordance with the calibration data.

Figure 4:
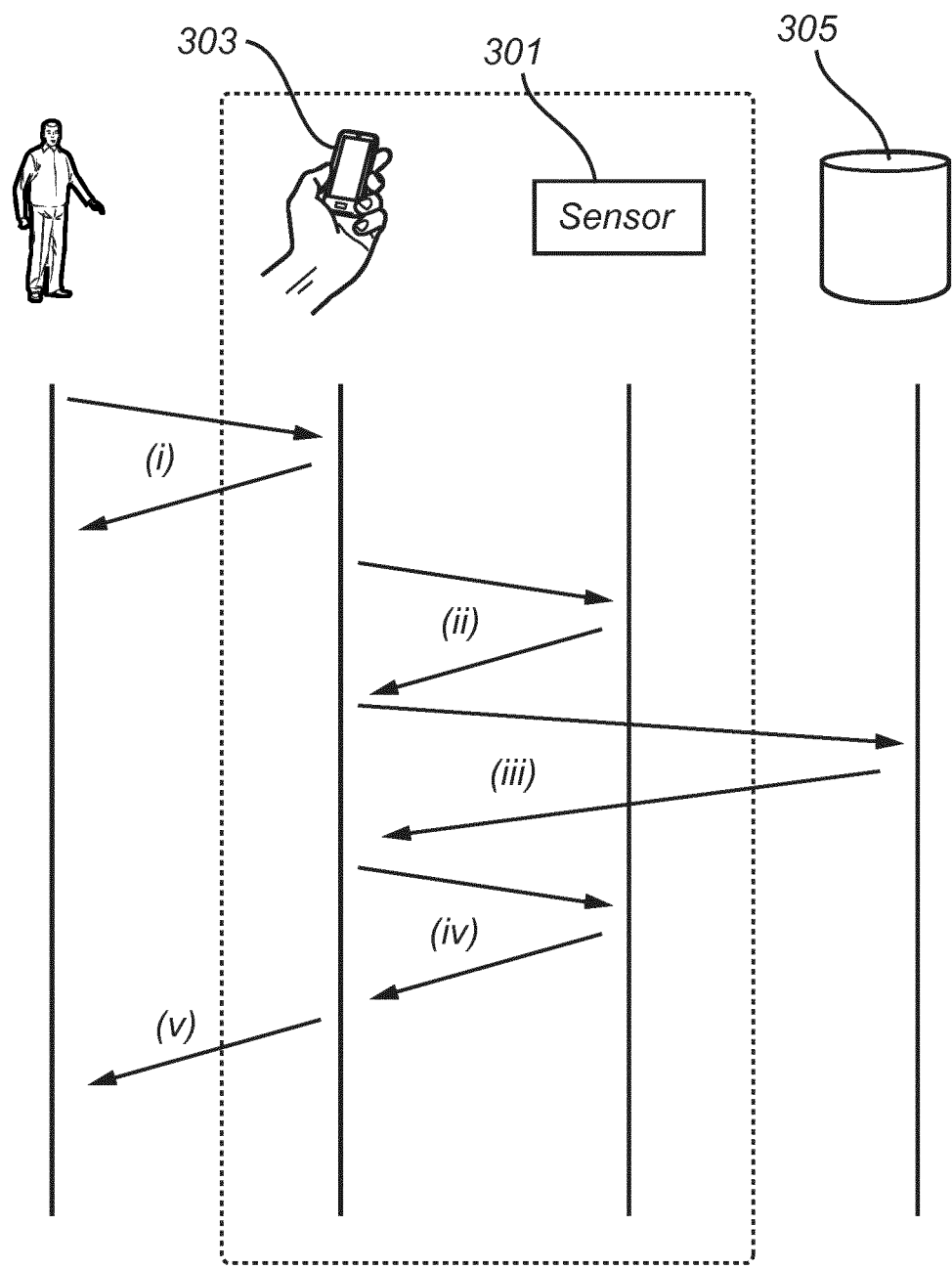
FIG. 4 schematically illustrates communication between parts of the system during the calibration.

More particularly, as illustrated in FIG. 4, the user of the first sensor 301 downloads an app, i.e. application program, to his/her mobile device 303, and initiates a calibration procedure by means of the app, at (i) of FIG. 4. A wireless, or wired, connection is established between the mobile device 303 and the first sensor 301, and an identification (ID) of the first sensor 301 is obtained by the app, at (ii). Preferably, the sensor ID is transmitted to the mobile device 303 by a request sent by the app and a response returned by the first sensor 301. Alternatively, the user is prompted to input the sensor ID, which is provide, e.g. at a label of the first sensor 301. The mobile device comprises a position provider, such as a GPS receiver, and obtains a position. As mentioned above, the position information may also include whether the sensor is indoor or outdoor. Then the mobile device 303 sends a request for calibration data to the server 305, at (iii). The request comprises sensor data, which at least includes the sensor ID and the position. Since the mobile device 303 is close to the sensor 301 the position of the mobile device is accurate enough to use as the position of the sensor 301 as well.

At reception of the request for calibration data, the server 305 compares the sensor ID to sensor IDs in a database to find other sensors of the same kind, i.e. sensors sensing the same physical quantity, which have already been calibrated. Then the server 305 requests sensor values from at least one other sensor 306, which has already been calibrated. The request(s) is sent to the mobile device(s) 307 associated with the other sensor(s), which in turn acquires a current value from the other sensor(s) 306. The mobile device 307 sends back this value to the server 305. Upon reception of the currently sensed value, the server 305 compares the positions of the requesting sensor, i.e. the sensor to be calibrated, 301, and the calibrated sensor(s) 306, and calculates an adjustment due to the different positions. The other sensor(s) in the system may be associated with mobile device(s) 307 as detailed herein above, but can also be equipped with communication means.

If it is possible to accurately compensate for different conditions at different positions, the calibrated sensor or sensors 306 can be rather far from the sensor 301 to be calibrated, such as several kilometers away. However this is generally strongly dependent on what physical quantity is measured. If the sensed values from several calibrated sensors 306 are used, typically some kind of mean value of them is determined.

The resulting value is used as calibration data, which is returned to the mobile device 303. The mobile device provides the calibration data to the sensor 301, which is then calibrated. Finally, the user is notified, by the mobile device 303, that the sensor 301 is ready for use.

There are many alternative embodiments of the methods. In one alternative, at regular intervals the sensors 306 report sensed values to the server 305, which updates a database. When the server receives a request for calibration data, it fetches values from the database, which values are thus up-to-date. This has the advantage of a faster response to the requesting mobile device 303. In addition, it is an advantage, particularly in this embodiment, but also in other embodiments, to timestamp the sensed values in order to ensure that the sensed values used for the calibration are relevant. The server 305 is provided with information defining a time limit for each kind of sensor, which varies depending on which physical quantity the sensor measures. Thus, the server 305 will be prevented from using sensed values which are too old to be reliably relevant. The variability over time for different physical quantities is different. The time stamp may be added by the sensor, or by some other device in the system, depending on how critical the time is, and how the system 300 manages to keep track on when the values were sensed. However, time stamping the sensed values at the sensors will eliminate effects of communication delays in the system 300.

According to another alternative, it is the mobile device 303 which performs the calculations; the server 305 merely provides the currently sensed values.

In addition to the position of the first sensor 301, the sensor data can include a currently sensed value which the mobile device 303 obtains from the first sensor 301, and which is compared with the currently sensed values from the other sensor(s) 306.

Figure 5:
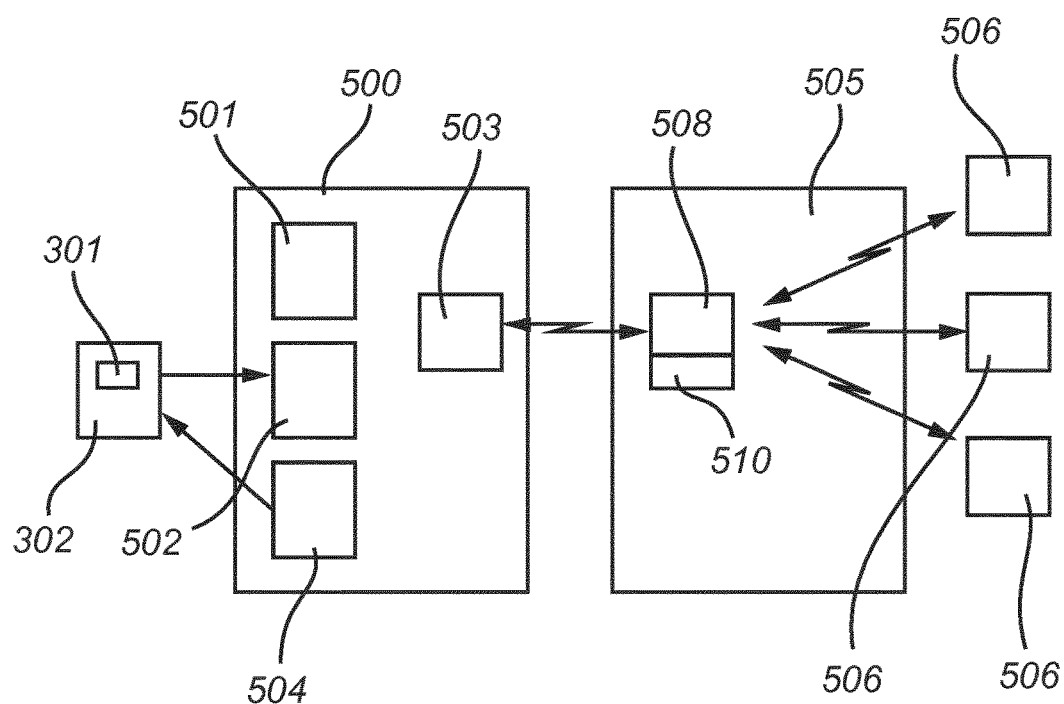
FIG. 5 is a schematic block diagram of embodiments of devices according to this invention.

According to an embodiment of the device for calibrating the sensor, e.g. a mobile device or a tablet, 500, as shown in FIG. 5, it comprises a position provider 501, such as a GPS receiver, means 502 for obtaining sensor data comprising identification data; means 503 for providing the sensor data to a calibration data provider and for obtaining calibration data from the calibration data provider; and means 504 for calibrating the sensor in accordance with the calibration data. As understood from above, these means 502, 503, 504 can be implemented primarily as software, but at least they will need physical interfaces for communicating with the sensor device 302 and the calibration data provider 505. Primarily hardware implemented means are feasible as well.

According to an embodiment of the calibration data provider 505, such as a server, it comprises means 508 for obtaining sensor data about a sensor to be calibrated; means 509 for obtaining currently sensed values from at least one calibrated sensor 506; means 507 for compensating the currently sensed values for a difference in position between the sensor 302 to be calibrated and the at least one calibrated sensor 506 and generating corresponding calibration data; and means 510 for providing the calibration data to the sensor. As understood from above, these means 507-510 can also be implemented primarily as software, but at least they will need physical interfaces for communicating with the device 500 for calibrating the first sensor 302, and for communicating with the second sensor(s) 506. Primarily hardware implemented means are feasible as well.

As an alternative embodiment, the sensor 301 comprises a user interaction application and a server connection such that the device for calibrating the sensor 301 is integrated in the sensor.

Initially, when the first user has bought a sensor, in order for the user to have some references to calibrate his sensor against, for instance the manufacturer may have placed some sensors, which were calibrated in advance, at strategic places.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of calibrating a given sensor, comprising:
   initiating a calibration procedure from a mobile device;

establishing a communication between the mobile device and the sensor;

obtaining an identification (ID) of the sensor by the mobile device;

determining a position of the mobile device;

sending a request for calibration data to a calibration data provider, the request comprising at least the identification (ID) of the sensor and the position of the mobile device;

receiving calibration data from the calibration data provider, the calibration data corresponding to currently sensed values by at least one other sensor that is already calibrated and of the same type as the given sensor to be calibrated;

providing the given sensor with the calibration data; and calibrating the given sensor, based on the calibration data, by adjusting the sensor such that an output of the sensor is in conformance with said calibration data.

2. The method according to claim 1, said sending the request comprising sending the identification (ID) to a server, and said receiving the calibration data from the calibration data provider comprising receiving the calibration data from the server.

3. The method according to claim 1, further comprising compensating the currently sensed values by factoring into the currently sensed values a difference in position between the given sensor to be calibrated and the at least one calibrated sensor.

4. The method according to claim 3, wherein the currently sensed values are dependent on at least one of latitude, longitude, altitude, and weather data.

5. The method according to claim 1, wherein the calibrating is a re-calibrating.

6. The method according to claim 1, wherein said determining a position comprises obtaining a position from a position provider internally of the mobile device.

7. The method according to claim 6, said sending the request and said receiving the calibration data being performed by the mobile device communicating with a server.

8. The method according to claim 6, wherein said providing the given sensor with the calibration data comprises communicating the calibration data to the given sensor from the mobile device.

9. The method according to claim 1, further comprising:
determining that the at least one other sensor is of the same type as the given sensor based on said identification (ID).

10. A device for calibrating a given sensor, comprising:
a position provider, configured to provide a position of the given sensor; and
at least one hardware processor configured to
obtain sensor data comprising identification data that identifies the given sensor;
provide the sensor data to a calibration data provider and obtain calibration data from the calibration data provider, the calibration data corresponding to currently sensed values by at least one other sensor that is already calibrated and is of the same type as the given sensor to be calibrated;
provide the calibration data to the given sensor to be calibrated; and
calibrate the given sensor, based on the calibration data, by adjusting the sensor such that an output of the sensor is in conformance with said calibration data.

11. A calibration data provider, comprising:
at least one hardware processor configured to
obtain sensor data about a given sensor to be calibrated;
obtain currently sensed values from at least one calibrated sensor of the same type as the given sensor to be calibrated;
compensate the currently sensed values by factoring into said currently sensed values a difference in position between the given sensor to be calibrated and the at least one calibrated sensor and generate corresponding calibration data;
provide the calibration data to the given sensor to be calibrated; and
calibrate the given sensor, based on the calibration data, by adjusting the sensor such that an output of the sensor is in conformance with said calibration data.

12. The calibration data provider according to claim 11, wherein the calibration data provider is arranged at a server.

13. The calibration data provider according to claim 11, wherein the at least one hardware processor is configured to determine that the at least one calibrated sensor is of the same type as the given sensor based on identification data identifying the given sensor that is included in the sensor data.

14. A method of providing a given sensor with calibration data, comprising:
receiving a calibration request from the given sensor, the request comprising sensor data including identification data that identifies the sensor and a position of the sensor;
generating calibration data, the calibration data corresponding to currently sensed values by at least one other sensor that is already calibrated and of the same type as the given sensor;
providing the given sensor with the calibration data; and
calibrating the given sensor, based on the calibration data, by adjusting the sensor such that an output of the sensor is in conformance with said calibration data.

15. The method according to claim 14, wherein said generating calibration data comprises obtaining the currently sensed values from the at least one other sensor, and compensating the currently sensed values by factoring into the currently sensed values a difference in position between the given sensor and the at least one other sensor.

16. The method according to claim 14, wherein the method is performed at a server communicating with a remote device.

17. The method according to claim 14, further comprising:
determining that the at least one other sensor is of the same type as the given sensor based on said identification data.

* * * * *